US012806120B2

(12) United States Patent
Chenvainu et al.

(10) Patent No.: US 12,806,120 B2
(45) Date of Patent: Nov. 24, 2026

(54) FEEDING BOTTLE

(71) Applicant: JMBH HOLDINGS, LLC, Shelton, CT (US)

(72) Inventors: Alexander Chenvainu, Shelton, CT (US); Charles Renz, Shelton, CT (US); Patrick Thrailkill, Shelton, CT (US)

(73) Assignee: JMBH Holdings, LLC, Shelton, CT (US)

(*) Notice: Subject to any disclaimer, the term of this patent is extended or adjusted under 35 U.S.C. 154(b) by 0 days.

(21) Appl. No.: 18/592,110

(22) Filed: Feb. 29, 2024

(65) Prior Publication Data

US 2024/0197572 A1 Jun. 20, 2024

Related U.S. Application Data

(63) Continuation of application No. 18/151,283, filed on Jan. 6, 2023, now abandoned, which is a continuation of application No. 16/772,098, filed as application No. PCT/US2018/064723 on Dec. 10, 2018, now Pat. No. 11,590,059.

(60) Provisional application No. 62/597,072, filed on Dec. 11, 2017.

(51) Int. Cl.

*A61J 9/00* (2006.01)
*A61J 9/06* (2006.01)
*A61J 9/08* (2006.01)
*A61J 11/00* (2006.01)
*A61J 11/04* (2006.01)

(52) U.S. Cl.

CPC ............ *A61J 9/001* (2013.01); *A61J 9/0623* (2015.05); *A61J 9/085* (2013.01); *A61J 11/008* (2013.01); *A61J 11/04* (2013.01)

(58) Field of Classification Search

CPC ........................ A61J 9/001
USPC ............ 215/11.3; 220/913; 229/93
See application file for complete search history.

(56) References Cited

U.S. PATENT DOCUMENTS

| | | | | | |
|---|---|---|---|---|---|
| 3,549,036 | A | * | 12/1970 | Ritsi | A61J 11/008 215/11.6 |
| 3,851,781 | A | | 12/1974 | Marco | |
| 4,796,937 | A | | 1/1989 | Andrea | |
| 4,815,615 | A | | 3/1989 | Phlaphongphanich | |
| 4,821,896 | A | * | 4/1989 | Cheng | A61J 9/04 215/11.5 |
| 4,919,983 | A | * | 4/1990 | Fremin | G01K 11/16 374/150 |
| 5,069,351 | A | | 12/1991 | Gunderson | |
| 5,617,972 | A | * | 4/1997 | Morano | B65D 1/265 221/33 |

(Continued)

FOREIGN PATENT DOCUMENTS

WO 9014066 W 11/1990

*Primary Examiner* — Nathan J Jenness
*Assistant Examiner* — Jennifer Castriotta
(74) *Attorney, Agent, or Firm* — Getz Balich LLC

(57) ABSTRACT

A cup or container assembly having a lip activated input feature. The lip activated feature permits removal of the contents from the cup or container while mitigating against leaks and/or spills. The lid includes a movable member and a baffle. The cup assembly is constructed to have streamlined assembly method due to a reduced number of parts needing separation and/or improved connecting features. The improved geometry of lid components lends to heightened ease of cleaning.

18 Claims, 13 Drawing Sheets

(56) References Cited

U.S. PATENT DOCUMENTS

| | | | | |
|---|---|---|---|---|
| 5,706,961 | A * | 1/1998 | Morano | B65D 33/007 383/35 |
| 5,758,787 | A * | 6/1998 | Sheu | A61J 11/04 215/11.1 |
| 6,244,452 | B1 | 6/2001 | Morano | |
| 6,616,000 | B1 | 9/2003 | Renz | |
| 6,910,594 | B2 * | 6/2005 | Foley | A61J 9/001 215/11.1 |
| 8,397,926 | B2 * | 3/2013 | Driver | A61J 11/0035 215/11.1 |
| 8,579,133 | B2 | 11/2013 | Marcus | |
| 11,311,094 | B2 | 4/2022 | Chung | |
| 2005/0056610 | A1 | 3/2005 | Randolph | |
| 2007/0163984 | A1 | 7/2007 | Nguyen | |
| 2008/0142467 | A1 | 6/2008 | Giles | |
| 2008/0302751 | A1 | 12/2008 | Segovia, Jr. | |
| 2010/0193460 | A1 | 8/2010 | Driver | |
| 2015/0144584 | A1 | 5/2015 | Renz | |
| 2016/0090216 | A1 | 3/2016 | Joyce | |

* cited by examiner

FEEDING BOTTLE

CROSS-REFERENCE TO RELATED APPLICATIONS

This application is a continuation of U.S. patent application Ser. No. 18/151,283 filed Jan. 6, 2023, which is a continuation of U.S. patent application Ser. No. 16/772,098 filed Jun. 11, 2020, which is a national stage application of PCT Patent Application Serial No. PCT/US18/64723 filed Dec. 10, 2018, which claims priority to U.S. Provisional Patent Application Ser. No. 62/597,072, filed Dec. 11, 2017, the entireties of which are incorporated by reference herein.

BACKGROUND OF THE PRESENT DISCLOSURE

Baby bottles are well known and typically include a bottle, a nipple, and a collar to secure the nipple to the collar. Known bottles are made from plastic materials and glass. As infants and babies require numerous feedings a day, bottles endure significant use and wear. Plastic bottles can warp, crack, scuff, obsoleting them or rendering them unattractive. Glass bottles can also crack, rendering them not only useless but hazardous. As such, a need exists for a resilient bottle, a bottle having improved durability.

Infant feeding can be a further challenging for working moms who can't directly feed baby and need to pump. While certain pump-to-feed systems exist, they include multiple parts requiring further maintenance, cleaning and storage. As such, a need exists for simplified pump-to-feed solution, particularly a cost-effective solution friendly to the environment. Infant feeding is further challenging in view of reflux, an ailment common to infants. Providing a bottle that reduces air ingestion can alleviate reflux symptoms.

SUMMARY OF THE PRESENT DISCLOSURE

The bottle of the present disclosure has a first layer. The first layer includes silicone, glass, or a resilient plastic material. In some embodiments, the bottle includes a second layer of material. The second layer of material includes a plastic material, a silicone, or thermoplastic or rubber material. The second layer is attachable to the first layer. The second layer can be co-molded, molded onto the first layer, sprayed onto the first layer, or the first layer can be dipped into a second material thereby forming a second layer onto the bottle. In some embodiments, the second layer is a discrete layer that is separate from the first layer. In some such embodiments, the second layer is a coating, or is a sleeve that fits around the first layer. In other embodiments, the first and second layer are co-molded or are molded in a two-shot process.

The bottle of the present disclosure can be substantially rigid and thus the bottle's shape and structure changes minimally despite applied forces. In other embodiments, the bottle can be, at least in some portions or regions of the bottle substantially flexible. In embodiments where at least a portion of the bottle is flexible, the bottle may further include an exterior shell (or holder). The shell (or holder) is more rigid than the substantially flexible portion(s) of the bottle. In some embodiments, the shell (or holder) is substantially rigid. In such embodiments having an exterior shell (or holder), the flexible bottle is suitably shaped and deflectable to fit within the shell (or holder) while maintaining the contents of the bottle. In other words, the bottle, despite its regions that are substantially flexible, can be filled with liquid prior to the bottle being inserted into the shell (or holder).

In some embodiments employing a shell, the shell substantially encompasses at least the outward wall or circumference of the bottle. In other embodiments, the shell encompasses the base or bottom of the bottle. In other embodiments, the shell encompasses substantially all of the bottle's outer periphery and bottom wall.

In some embodiments employing a shell, the bottle is a pod having a liner and a closing feature. The closing feature is optionally a liner cap. The pod can be a single-use system, or can be a reusable system.

In some embodiments, the bottle is substantially flexible such that it is openable and closeable. In other words, the bottle can be filled and closed (without a fastener or cap) by depressing the upper end region of the bottle with a user's hand. Similarly, the bottle can be opened by releasing the upper end of the bottle (i.e., allowing the deflected upper region of the bottle to regain its normal configuration (i.e., normal when holding fluid).

In other embodiments, the bottle has a sealing mechanism such that the bottle can be filled, closed, opened and emptied. The sealing mechanism can include a zipper closure, press-seal (i.e. semi-stick or resealable materials), etc. . . . In some embodiments, a perforation is included below the sealing mechanism. In other embodiments a perforation is included above the sealing mechanism (i.e. to ensure the bottle is clean prior to initial use).

In other embodiments, the bottle is attachable to a breast pump system. The bottle is attachable directly or indirectly to the pump. In some embodiments, the bottle is attached directly to the pump. In embodiments employing a shell, the shell is optionally attachable to the pump.

In some embodiments, the bottle enables the use of a conventional breast pump and a conventional nipple. The bottle thusly has helical threads or is capable of mating with or being secured to helical threads found on breast pumps and collars.

In some embodiments, the bottle is suitable for use as a long term storage means for fluid. The bottle is made from a material that has a suitable moisture barrier, oxygen barrier, or combination thereof. The bottle is made from a material that won't deteriorate upon change in temperatures (i.e. from freezing to boiling).

In some embodiments, the bottle is multi-faceted such that it is adaptable for various conditions such as attaching to a breast pump, being sealed and stored in a freezer, being thawed and integrated into a bottle feeding system for infants. In this latter stage, the bottle is attachable to or used within a standalone bottle assembly that is optionally reusable. The bottle is itself optionally a single-use or multi-use use bottle, or is made from a material that enables recycling of one or more components of the bottle.

In some embodiments, the first layer and the second layer may have different aesthetics (i.e. the first layer is translucent and the second layer is colored, vice versa, or both are semi-translucent and at least one is colored).

In some embodiments, the bottle includes a thermochromic material that changes opacity, color, and/or hue upon a change in temperature. In some embodiments, the thermochromic material is in the first layer (or inner layer). In other embodiments, the thermochromic material is in the outer second layer (or outer layer). In some embodiments, thermochromic material is in both layers. In yet other embodiments, the thermochromic material is situated such that it contacts in the inner surface of the bottle. In yet other embodiments, the thermochromic material is situated such that it contacts the outer surface of the bottle. In these embodiments, the thermochromic material is has a first aesthetic and a first temperature state. The first aesthetic can include a first level of opacity or translucency, a first color, or a first hue. The thermochromic material has a second aesthetic and a second temperature state. The second aesthetic can include a second level of opacity or translucency, a first color, or a first hue. In some embodiments, the first temperature state is a range of temperatures that are reasonable during the consumption of nourishment such as food or liquids. A second temperature state is a range of temperatures that are unreasonable during the consumption of nourishment such as food or liquids. As such, the second temperature range can be too hot or too cold. To the extent the bottle is chilled to be too hot or too cold and thus is within the second temperature state and exhibiting a second aesthetic, the bottle can thereafter be warmed or cooled, respectively, to achieve a reasonable temperature within the first temperature state. In these latter embodiments, a third aesthetic can be achieved that is in between the first aesthetic and the second aesthetic. By means of an example, if the second aesthetic is semi-transparent and clear, and the first aesthetic is substantially opaque and green, the third aesthetic would be semi-opaque and/or a lighter green than the first aesthetic. In these embodiments, other containers such as bowls, plates, spoons and/or snack containers that require temperature change or are susceptible to temperature change can have surfaces or layers including thermochromic material as described above. The first temperature state range is between about 23 degrees Celsius and about 40 degrees Celsius. The second temperature state range is greater than about 40 degrees Fahrenheit.

In some embodiments, the bottle liner has a tapered geometry such that the upper end of the bottle has a greater cross-sectional area than the bottom end. In other embodiments, the bottle has an amorphous geometry due to the inherent flexibility in the bottle. The bottle, in some embodiments, has pleats or is capable of expanding/collapsing.

In some embodiments, the bottle is a closed system such that once liquid is within the bottle and the bottle is attached to the nipple (perhaps via a collar), no more air can enter the system. In some such embodiments, the bottle is substantially flexible such that the bottle can be bled to remove any excess air trapped in the bottle prior to attaching the nipple, in other embodiments, the bottle is substantially flexible such that it will collapse upon the pressure exerted by the infant during feeding, such that the bottle will act similarly to that of a human breast. In such embodiments, to the extent the bottle is bled, the bottle will mitigate against vacuum found in non-vented bottles (and vented bottles where the vent does not activate upon the suction force exerted by the infant).

In yet other embodiments, the bottle is attachable to other components or includes other components. For instance, the bottle includes a straw valve that assists in communicating air towards the back or bottom end of the bottle while baby is feeding. This effectively pushes air behind the fluid and not through the fluid, thereby reducing mixing air with fluid and reducing air ingestion.

The bottle of the present disclosure optionally includes an enhanced gripping feature. The gripping feature is on the nipple ring or on the upper portion of the bottle. The gripping feature has an enlarged height and/or an enlarged depth, width, radial direction. The gripping feature has protuberances or ribs that have a height that extends outward from an underlying gripping feature surface. The gripping feature has a geometry that flares outward towards the upper nipple end of the bottle such that the widest portion of the gripping feature is proximal the nipple.

The bottle of the present disclosure optionally includes a textured main bottle portion, covering at least a portion of the lower, middle, and/or upper portion of the bottle wall. This texture includes raised structures to assist in gripping the bottle. In some embodiments having a fluid level indicator or volume gradations, the textured portion does not interfere with reading such indicator(s) or gradations. In some embodiments, the textured portion forms two intersecting lines on either side of the bottle to assist in gripping. The two intersecting lines can be an X, a cross, or other shape that suitable permits placement of a user's thumb in between such raised intersecting lines. In some embodiments, the intersecting lines provide extra strength or rigidity for the bottle.

A reusable bottle liner has an outer wall and an inner wall opposite the outer wall. The inner wall defines a storage volume. The liner has an open end opposite a closed end. The open end is defined by an upper end having a lip. The upper end has a connecting means between the lip and a ledge opposite the lip. The liner has an upper end thickness between 1 mm and about 5 mm. The liner has a lower end thickness between about 0.1 mm and about 1 mm.

The connecting means are one or more threads. The connecting means are on the inner wall. The connecting means are on the outer wall.

A liner cap has a liner connecting means that matingly engage the connecting means on the liner. The liner cap has a top surface and a bottom surface opposite the top surface. The bottom surface has a lip extending downwardly therefrom about the peripheral surface. The bottom surface has a lower edge radially inward from the lip. The lip on the liner cap matingly engages the lip on the liner. The lower edge matingly engages the ledge on the liner.

The liner is silicone having a durometer of between about 40 and about 70. The liner includes a taper extending downwardly from the ledge. The upper end of the bottle liner has a generally circular cross-sectional shape. The liner has a tapered shape towards the closed end.

A bottle holder has an open top end opposite an open bottom end. The bottle holder has a substantially circular cross-sectional shape. The bottle holder has a bottle holder body that extends substantially around a periphery of the bottle holder at a given cross-sectional slice of the bottle holder. The open top end is suitably sized to receive the reusable bottle liner.

The bottle holder has an angle of between about 15 degrees and about 45 degrees. The bottle holder has an articulating joint permitting the bottle holder to rotate between a substantially vertical configuration and an angled configuration, wherein the angled configuration has an angle of between about 15 degrees and about 45 degrees.

The bottle holder has one or more grip structures having an arcuate shape, the one or more grip structures having a height of between about 0.5 mm and about 3 mm. The one or more grips structures comprises at least two grip structures forming a cross pattern.

A collar has a generally circular cross-section shape, the collar having an upper end and a lower end opposite the lower end. The cross-section shape increases in size from the lower end to the upper end. The collar further has one or more grip structures having an arcuate shape. The one or more grip structures has a height of between about 0.5 mm and about 3 mm.

DETAILED DESCRIPTION OF THE PRESENT DISCLOSURE

Figure 18:
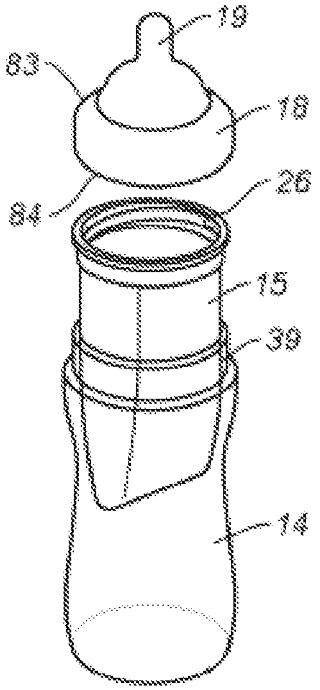
FIG. 18 is a top angled view of a bottle assembly according to one embodiment of the present disclosure.
Figure 19:
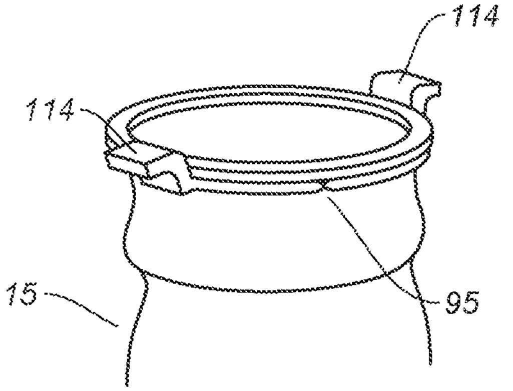
FIG. 19 is a top angled detail view of a liner according to one embodiment of the present disclosure.
Figure 19A:
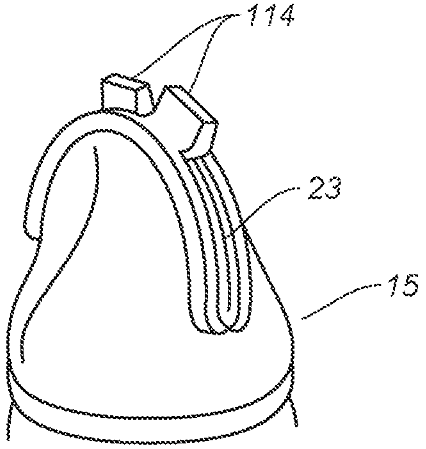
FIG. 19A is a top angled detail view of a liner according to one embodiment of the present disclosure.
Figure 20:
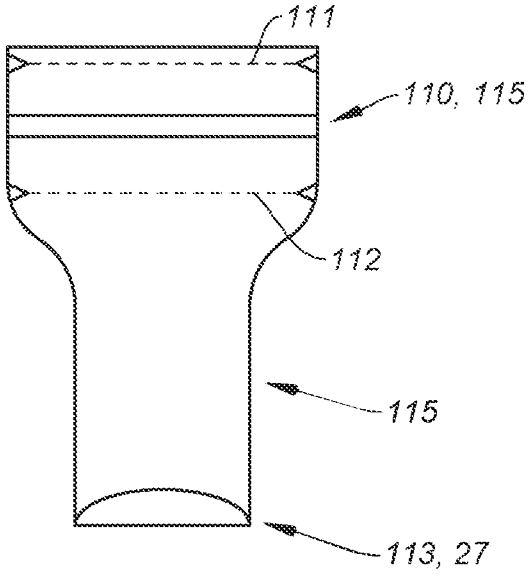
FIG. 20 is a diagrammatic view of a liner according to one embodiment of the present disclosure.
Figure 21:
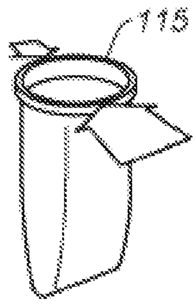
FIG. 21 is a front angled detail view of a liner according to one embodiment of the present disclosure.
Figure 21A:
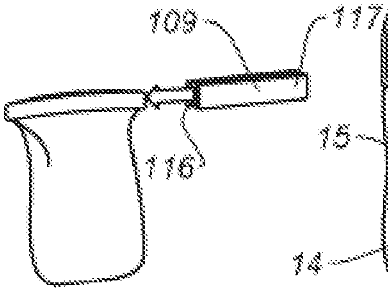
FIG. 21A is a front angled detail view of a liner according to one embodiment of the present disclosure.
Figure 22:
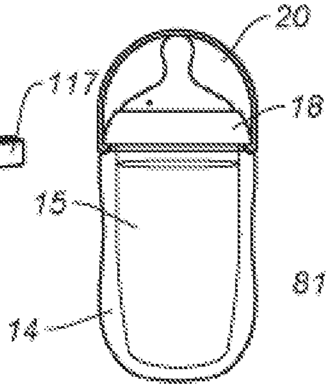
FIG. 22 is a front view of a bottle assembly according to one embodiment of the present disclosure.
Figure 23:
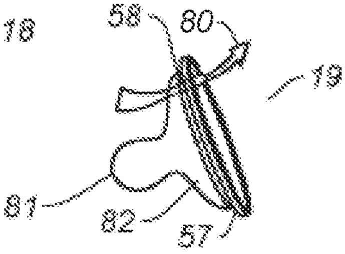
FIG. 23 is a diagrammatic view of a nipple according to one embodiment of the present disclosure.
Figure 24:
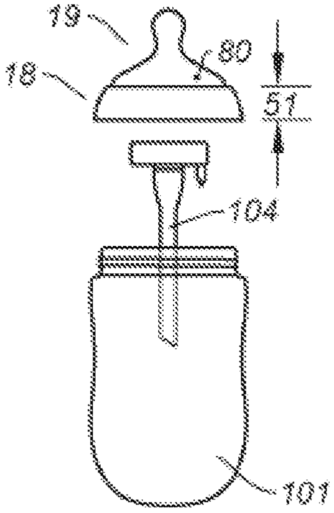
FIG. 24 is a diagrammatic view of a bottle assembly according to one embodiment of the present disclosure.
Figure 25:
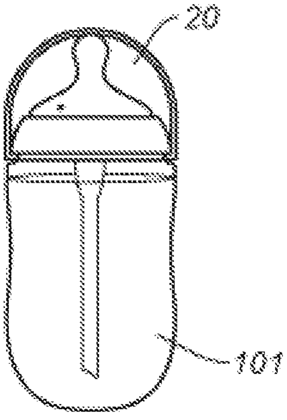
FIG. 25 is a diagrammatic view of a bottle assembly according to one embodiment of the present disclosure.
Figure 25A:
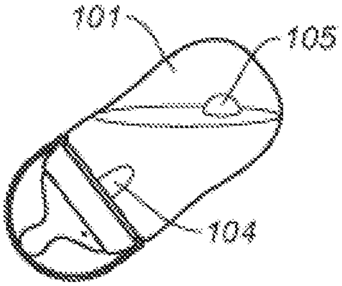
FIG. 25A is a diagrammatic view of a bottle assembly according to one embodiment of the present disclosure.
Figure 26:
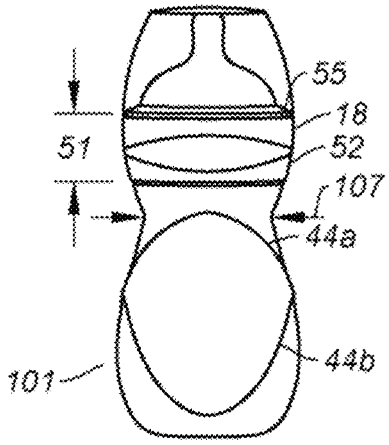
FIGS. 26-26B are views of various embodiments of a bottle assembly according to the present disclosure.
Figure 26A:
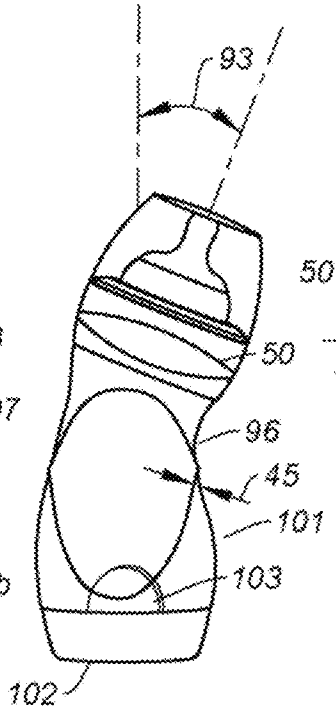
Figure 26B:
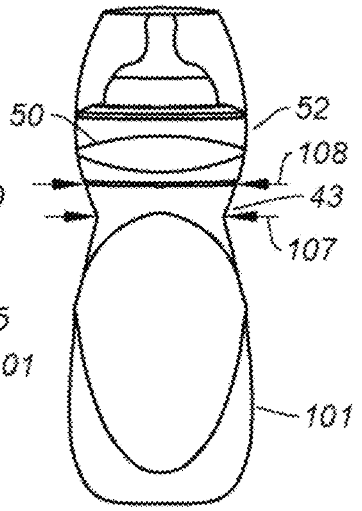
Figure 27:
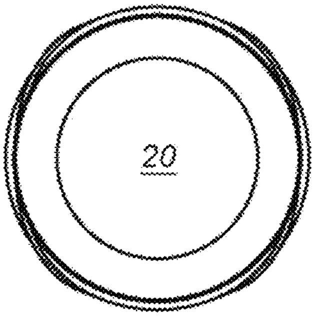
FIG. 27 is a top view of a bottle assembly according to one embodiment of the present disclosure.
Figure 27A:
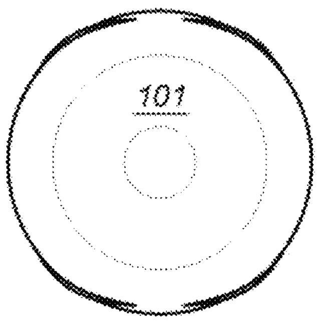
FIG. 27A is a bottom view of a bottle assembly according to one embodiment of the present disclosure.
Figure 27B:
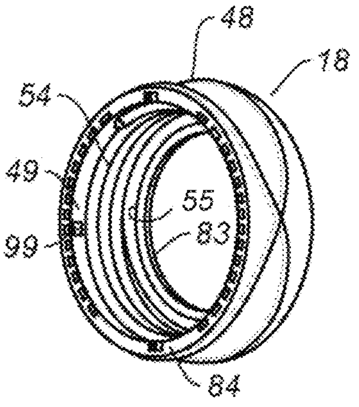
FIG. 27B is a bottom angled view of a collar according to one embodiment of the present disclosure.
Figure 28:
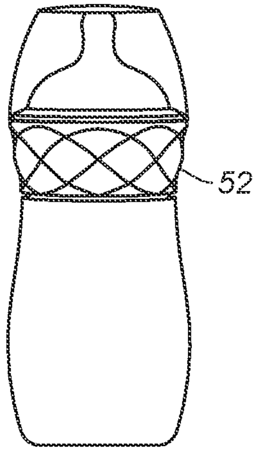
FIGS. 28-28B are views of various embodiments of a bottle assembly according to the present disclosure.
Figure 28A:
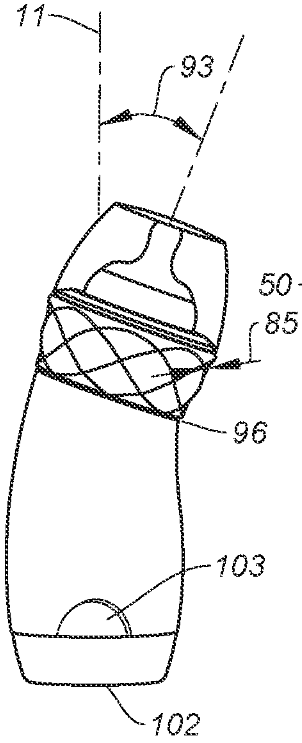
Figure 28B:
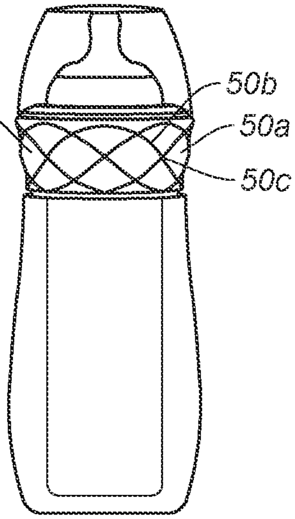
Figure 29:
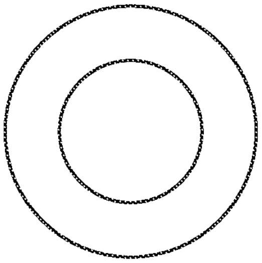
FIG. 29 is a top view of a bottle assembly according to one embodiment of the present disclosure.
Figure 29A:
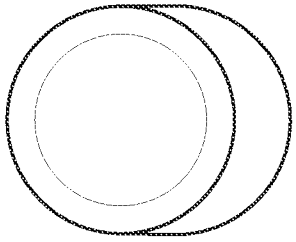
FIG. 29A is a bottom view of a bottle assembly according to one embodiment of the present disclosure.

A bottle assembly 10 is provided and exemplified by FIG. 18. Bottle assembly 10 is suitable for feeding an infant. A central vertical axis 11 is generally provided to relate features and components as described throughout the present disclosure.

Figure 1:
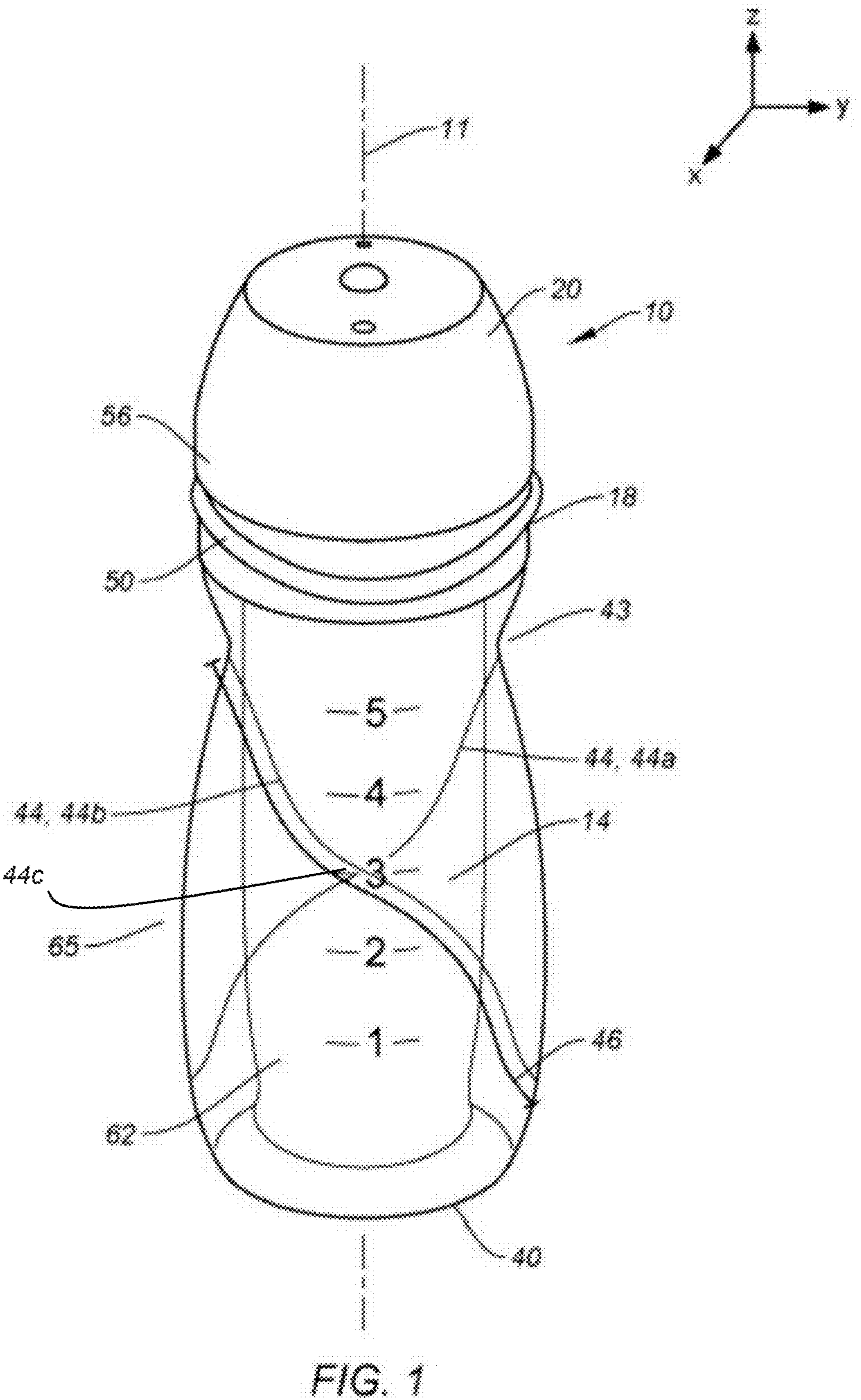
FIG. 1 is a diagrammatic view of a bottle assembly according to one embodiment of the present disclosure.
Figure 2:
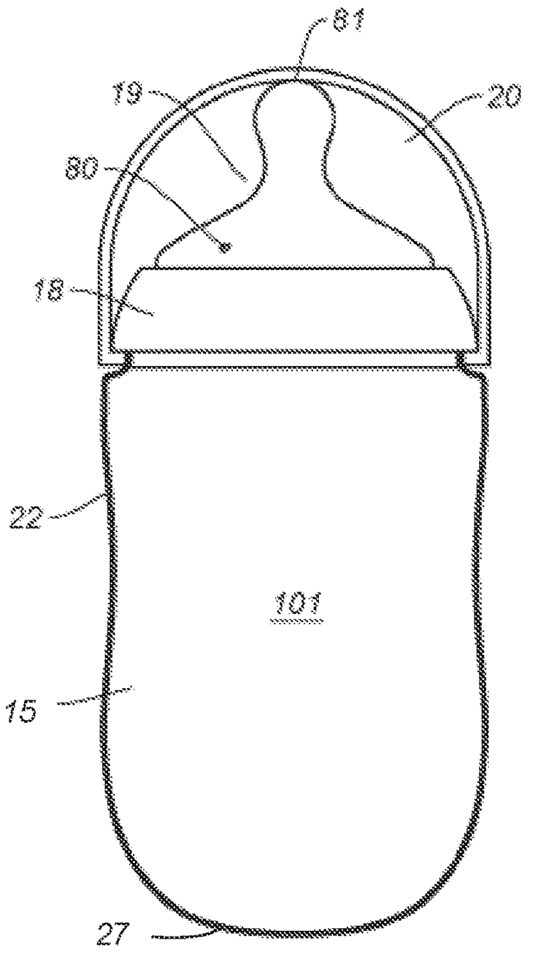
FIG. 2 is a diagrammatic view of a bottle assembly according to one embodiment of the present disclosure.
Figure 3:
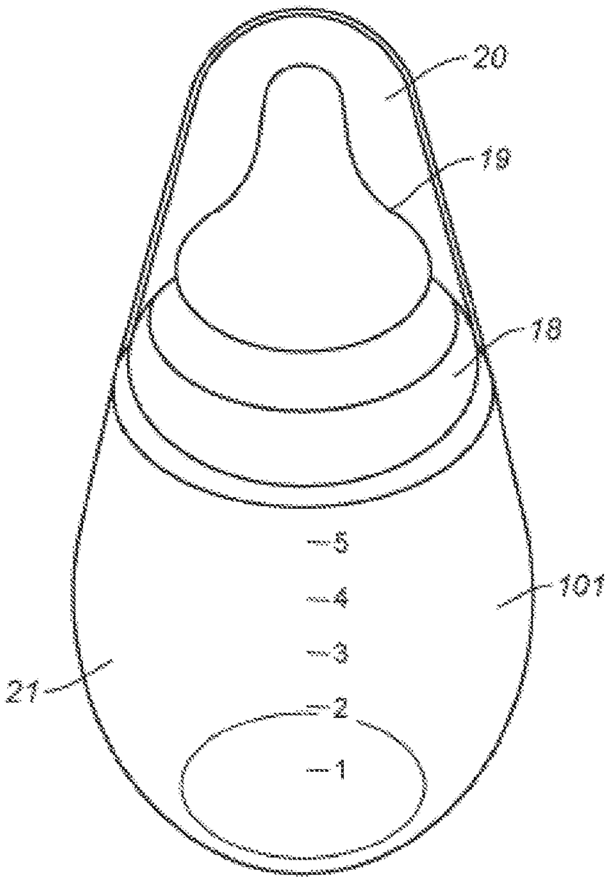
FIG. 3 is a diagrammatic view of a bottle assembly according to one embodiment of the present disclosure.
Figure 4:
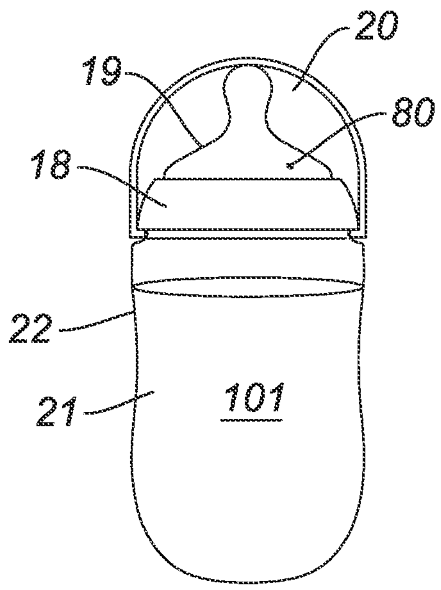
FIG. 4 is a diagrammatic view of a bottle assembly according to one embodiment of the present disclosure.
Figure 5:
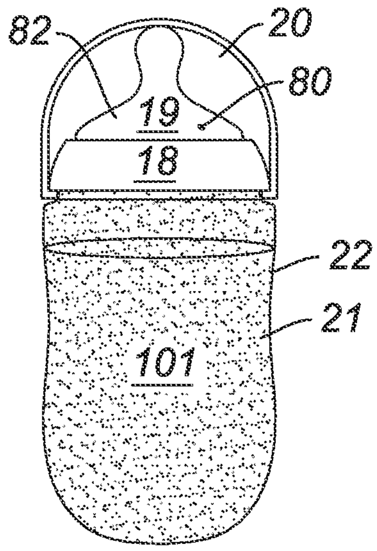
FIG. 5 is a diagrammatic view of a bottle assembly according to one embodiment of the present disclosure.
Figure 6:
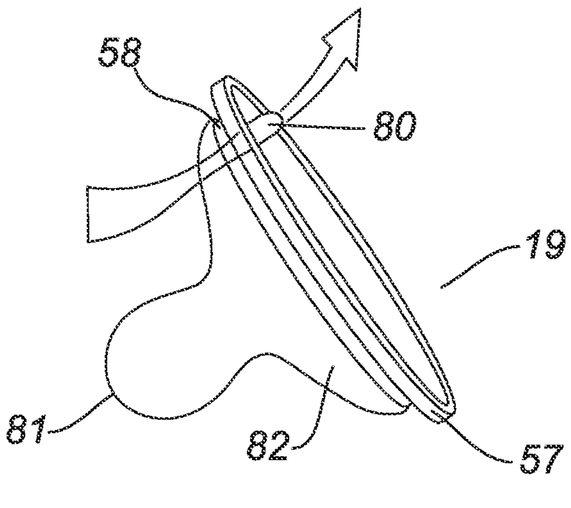
FIG. 6 is a diagrammatic view of a nipple according to one embodiment of the present disclosure.
Figure 7:
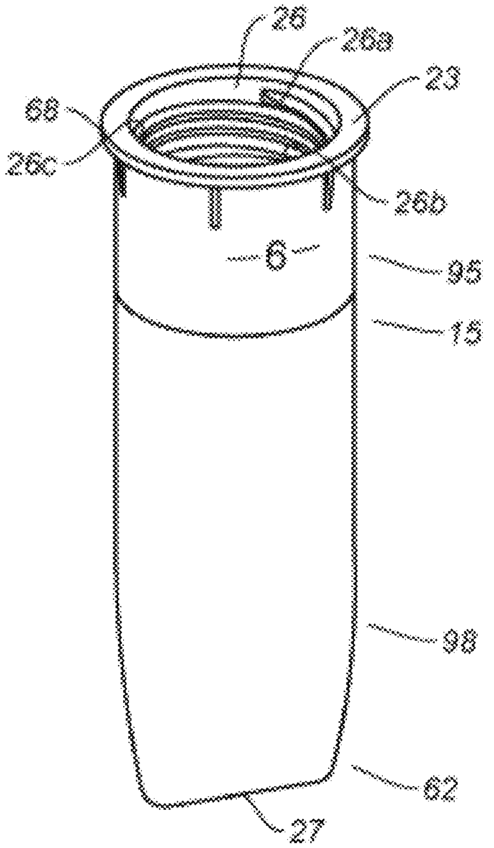
FIG. 7 is a diagrammatic view of a liner according to one embodiment of the present disclosure.
Figure 7A:
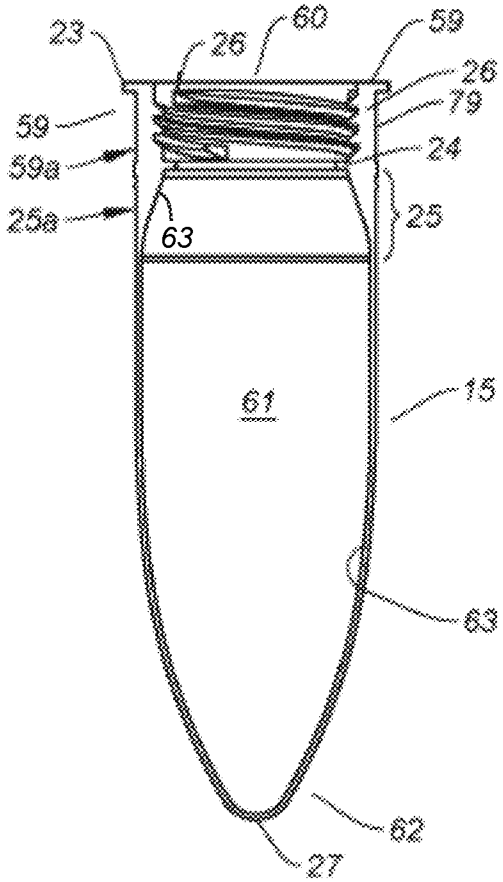
FIG. 7A is a cross-sectional view of a liner according to one embodiment of the present disclosure.
Figure 8:
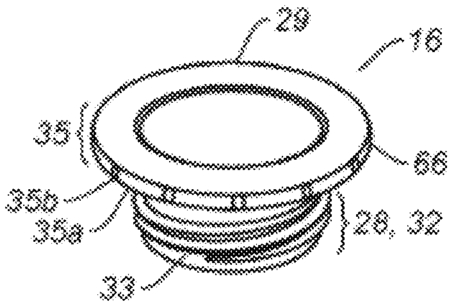
FIG. 8 is an angled top view of a liner cap according to one embodiment of the present disclosure.
Figure 8A:
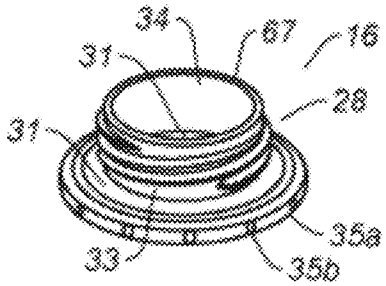
FIG. 8A is an angled bottom view of a liner cap according to one embodiment of the present disclosure.
Figure 9:
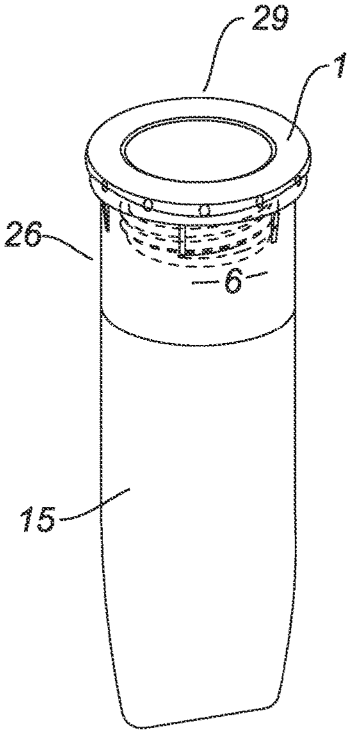
FIG. 9 is a diagrammatic view of a liner and liner cap according to one embodiment of the present disclosure.
Figure 10:
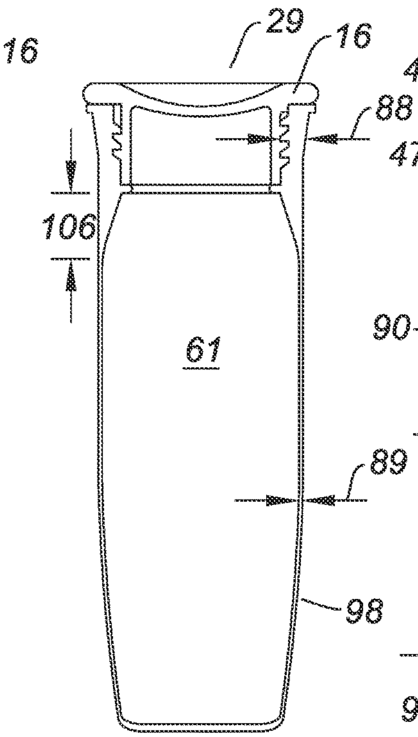
FIG. 10 is a cross-sectional view of a liner and liner cap according to one embodiment of the present disclosure.
Figure 10A:
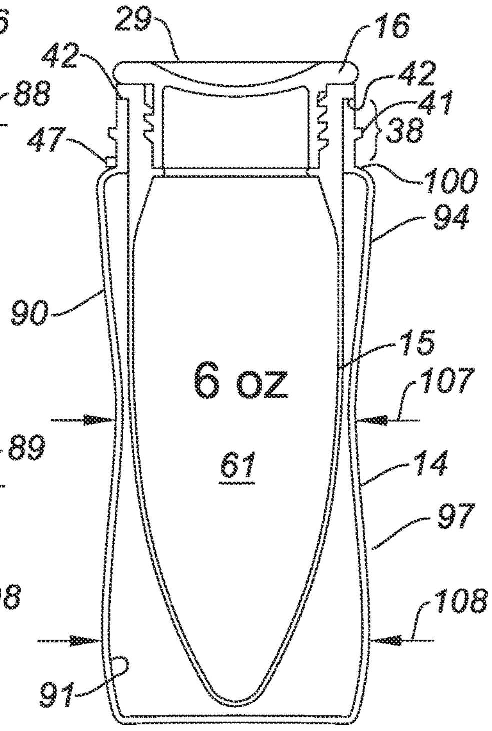
FIG. 10A is a cross-sectional view of a holder, a liner, and liner cap according to one embodiment of the present disclosure.
Figure 11:
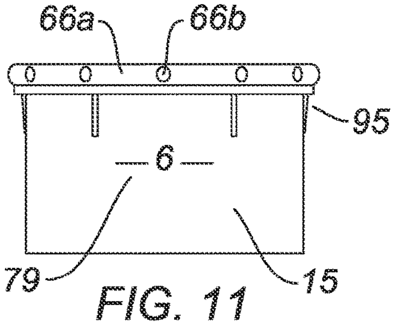
FIG. 11 is a detail view of a liner and liner cap according to one embodiment of the present disclosure.
Figure 12:
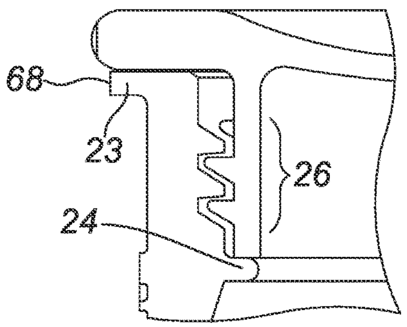
FIG. 12 is a cross-sectional view of a liner and liner cap according to one embodiment of the present disclosure.
Figure 13:
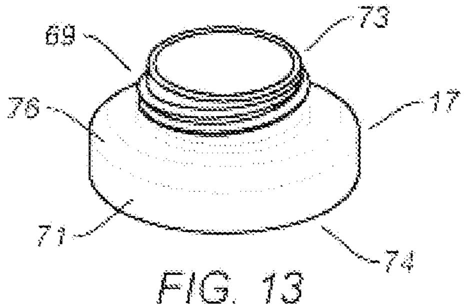
FIG. 13 is a top angled view of an adapter according to one embodiment of the present disclosure.
Figure 14:
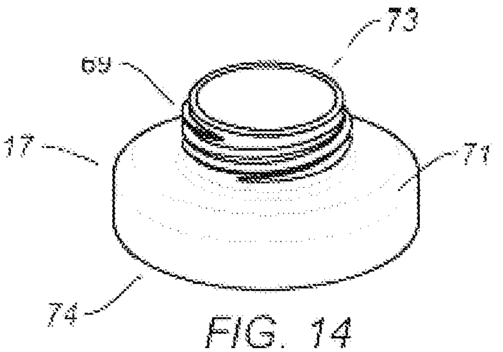
FIG. 14 is a top angled view of an adapter according to one embodiment of the present disclosure.
Figure 13A:
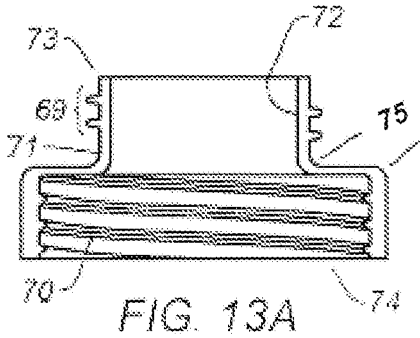
FIG. 13A is a cross-sectional view of an adapter according to one embodiment of the present disclosure.
Figure 14A:
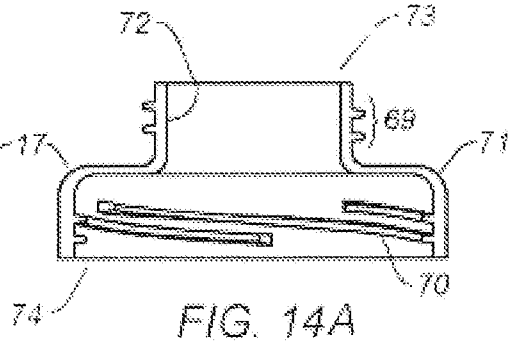
FIG. 14A is a cross-sectional view of an adapter according to one embodiment of the present disclosure.
Figure 15:
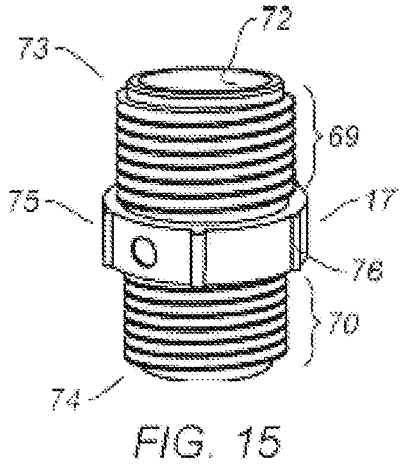
FIG. 15 is a front angled view of an adapter according to one embodiment of the present disclosure.
Figure 16:
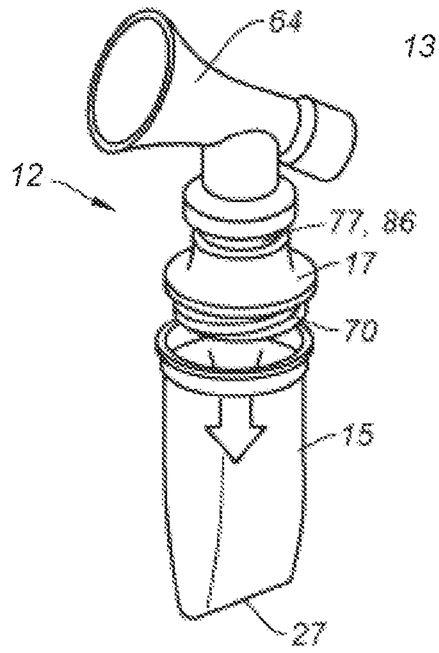
FIG. 16 is a top angled view of a pumping assembly according to one embodiment of the present disclosure.

A pump assembly 12 is also provided and is exemplified by FIG. 16. Certain components of bottle assembly 10 are compatible with and/or interchangeable with components of pump assembly 12.

Figure 17:
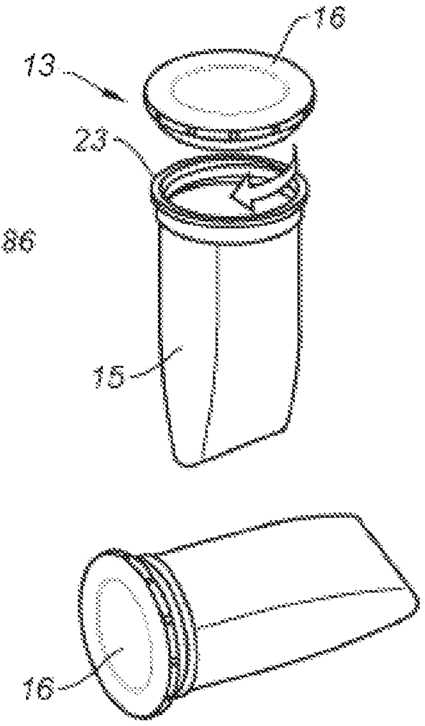
FIG. 17 is a top angled view of a storage assembly according to one embodiment of the present disclosure.

A storage assembly 13 is also provided and is exemplified by FIG. 17. Certain components of bottle assembly 10 and/or pump assembly 12 are compatible with and/or interchangeably with storage assembly 13.

A bottle assembly 10 has a first layer 21. First layer 21 is optionally at least a portion of liner 15 or bottle holder 14. The bottle assembly 10 has a second layer 22. The second layer 22 is optionally a coating (or layer) applied to liner 15 or to bottle holder 14.

In one embodiment, the first layer 21 is silicone. In embodiments where the first layer 21 is silicone, no additional layer is required.

In one embodiment, the first layer 21 is glass. In this embodiment, a second layer 22 is optionally provided. The second layer 22 is silicone, a thermoplastic or rubberized coating. Such second layer 22 mitigates against breaking or cracking if the bottle assembly 10 having such first layer 21 were to be capsized without second layer 22. The second layer 22 has a thickness between about 0.5 mm (about 0.02 inches) and about 2 mm (about 0.08 inches).

In some embodiments, the first layer 21 or second layer 22 includes a thermochromic material. The thermochromic material changes the appearance of the bottle holder 14 in different temperature states (or liner 15, as applicable) such that the user is aware of a condition suggesting feeding from the bottle holder 14 (or liner 15, as applicable) is suitable or is unsuitable. A first temperature state or a suitable temperature state is between about 23 degrees Celsius and about 40 degrees Celsius. A second temperature state or an unsuitable temperature state that is too hot exceeds about 40 degrees Celsius. The thermochromic material is tuned to turn from a first color (or perhaps from translucent or opaque) to a second color when the temperature has achieved and is within the first temperature state. Optionally, the thermochromic material changes to a third color when the temperature has achieved and is within the second temperature state in order to warn the user that the contents/fluid are too hot for consumption.

A liner 15 is provided. The liner 15 has an upper end 59 that is open 60 that is substantially opposite liner closed end 27 at the bottom 62 of liner 15 such that fluid can be deposited through the open 60 upper end 59 be stored within the liner 15. As such, liner 15 defines a storage volume 61 for holding fluid. The liner has an outer wall 79 opposite an inner wall 63 defining the storage volume 61.

The liner has a lip 23 at the upper end 59. Lip 23 extends radially outwardly. Liner 15 has cap connecting means 26 for connecting to liner cap 16. Cap connecting means 26 include one or more thread segments **26*a*. As shown in the figures, cap connecting means 26 includes at least one thread 26*a*, or two threads 26*a*-26*b*, or three connecting threads 26*a*-26*c*. Threads 26*a-c* are helical. Threads 26*a-c* make a full revolution about the liner inner wall 63. Cap connecting means have an inferior end forming liner ledge 24**.

Liner 15 has a wall thickness taper **25*a* extending downward from liner ledge 24. Taper 25 is advantageous in that it avoids a blind surface underneath ledge 24 that can be difficult to clean. Taper 25 preferably has a length 106 of less than or equal to 30 mm (about 1.2 inches), or less than about 20 mm (about 0.9 inches) in order to avoid additional costs for material. Taper 25 preferably has a length 106 that is greater than about 10 mm (about 0.2 inches) in order to be sure the transition between upper end 59 (which is thicker) is smooth to lower portion 98 (that is thinner), avoiding any blind areas/crevices that are difficult to clean and difficult to mold. Liner 15 has a thicker region in upper end 59 through cap connecting means 26 to provide stability in connecting to cap 16 and/or pump 64, and generally for storing vertically along central vertical axis 11 and/or on its side. The thickness 59*a* of the upper end 59 to the ledge 24 is between about 1 mm (about 0.04 inches) and about 10 mm (about 0.4 inches), or between about 1 mm (about 0.04 inches) and about 5 mm (about 0.2 inches). The thickness of the liner below ledge 24** is between about 0.5 mm (about 0.02 inches) and about 2.0 mm (about 0.08 inches) or between about 0.4 mm (about 0.015 inches) and about 1.5 mm (about 0.06 inches), or between about 0.5 mm (about 0.02 inches) and about 1 mm (about 0.04 inches).

Liner 15 is generally cylindrical, but optionally has a taper, conical, triangular prismatic, faceted, or frustum shape such that the bottom end 62 is flat, rounded, or chamfered. The bottom end 62 with a shape deviating from that of a cylinder mitigates against the liner 15 from rolling when placed on its side, and thus improves storage options. Liner 15 having a generally cylindrical shape specifically at liner upper end 59 (and liner opening 60) is preferable in that it lends itself to being compatible with existing collars 18, nipples 19, and bottle holders 14. Further still, this accommodates a breast-like nipple 19 shape as opposed flat liners having a flattened nipple shape, such as KIINDE TWIST branded feeding bottles.

The liner 15 is made from silicone or latex. Silicone with a durometer of between 40 and 70 is preferable, such that the silicone is soft and flexible. The liner 15 is flexible such that depending on the volume of the contents being stored within the liner, the liner 15 is able to lay flat on its side and reduce the amount of space required for storage.

A unique aspect of the present disclosure is that liner 15 is reusable. Existing liners and bags that are configurable to store breast milk are single-use. The liner 15 is made from a material that is recyclable. The reusable material is cleanable by hand and/or by dishwasher, and withstands wear and temperature changes over the useful life of the liner 15. The liner 15 having a material and dimensions as contemplated in the present disclosure is suitable for re-use.

The liner 15 of the present disclosure mitigates against air mixing with the fluid within liner volume 61. Liner 15 can be squeezed to bleed-out any air through nipple orifice 81, thereby creating a breast-like closed system.

Liner cap 16 has a top surface 29 and a bottom surface 31 opposite thereto. Liner cap 16 has an inner surface 34 opposite an outer surface 35. Outer surface 35 has peripheral surface 66 providing a grip feature such as an undulating geometry. Peripheral surface 66 can include one or more recesses **66*b* and/or one or more protrusions 66*a* as the grip feature that assist the user in securely holding liner cap 16. Recess(es) 66*b* and/or protrusion(s) 66*a* have a depth of at least about 0.5 mm (about 0.02 inches), and up to about 5 mm (about 0.2 inches), and preferably between about 1 mm (about 0.04 inches) and about 3 mm (about 0.12 inches). Outer surface 35 includes external connecting means 28 that enable connection to the liner 15. Liner connecting means 28 are one or more thread segments. As shown in the figures, liner connecting means 28 includes at least one thread such as one, two or three connecting threads. Threads 28 are helical. Threads 28 make a full revolution about the cap outer surface 33**.

Liner cap 16 is reusable. Liner cap 16 is plastic, thermoplastic, rubber, or silicone material. Preferably, liner cap 16 is hard or rigid to facilitate connecting liner cap 16 to liner 15. Liner cap 16 has a thickness of at least 2 mm (about 0.08 inches).

Liner connecting means 28 has neck 32 that extends downwardly from cap bottom surface 31, thereby having a lower edge 67. Lower edge 67 mates with liner ledge 24. Liner 22 Liner cap 16 has a lip 30 extending downwardly from the peripheral surface 66. Lip 30 is sized to surround the outer perimeter 68 of liner lip 23. As such, when liner cap 16 is fully connected to liner 15, there are three points of sealing—the cap lower edge 67 with ledge 24, the liner connecting means 28 with cap connecting means 26, and liner cap lip 30 with liner lip 23. Such redundancy in sealing between the liner cap 16 and the liner 15 mitigates against spills or leaks from jostling, temperature variation leading to changes in state (from liquid to solid, and solid to liquid).

As described above, liner 15 and liner cap 16 form a storage assembly 13. Storage assembly is advantageous in that it includes one or more of the following: reusable components, durable components, at least two sealing points (between liner 15 and liner cap 16), a liner 15 that is adaptable to be used for feeding as a bottle holder 14, a liner 15 that is adaptable to be connected to a breast pump 64, and a liner 15 minimizing blind regions and small crevices that are difficult to clean.

Adapter 17 has a pump connecting means 69 at top end 73. Liner connecting means 70 is at the bottom end 74 opposite to the top end 73. Pump connecting means 69 and liner connecting means 70 are optionally one or more thread segments, which can be helical, and can extend a full revolution. Adapter 17 has an outer surface 71 and an inner surface 72 opposite the outer surface 71. Adapter 17 optionally has middle region 75 separating pump connecting means 69 and liner connecting means 70. Middle region 75 optionally provides a grip structure 76 to assist the user in gripping adapter 17 when it is connected to the breast pump 64 and liner 15.

Pump connecting means 69 is on the outer surface 71 such that it engages internal connecting means 77 such as threads on breast pump 64.

Liner connecting means 70 is on the inner surface 72 such that it engages collar connecting means 41 on the outer surface 90 of bottle holder 14. In some embodiments, it is preferable for the adapter 17 to connect to the bottle holder 14 when liner 15 is retained within the bottle holder 14. This configuration affords greater stability to liner 15 when liner 15 is removed from breast pump 64 (and/or adapter 17) such that liner 15 is positioned upright along central vertical axis 11 (and liner opening 60 is elevated) and less likely to spill while liner cap 16 is connected onto liner 15.

Alternatively, liner connecting means 70 is on the outer surface 71 such that it engages cap connecting means 26 on the liner inner wall 63. This configuration is advantageous in that it reduces the need to have bottle holder 14 available with the pumping assembly 12.

In an alternative embodiment, liner 15 has cap connecting means 26 that are on the liner outer wall 79. Cap connecting means 26 is on the upper end 59. Cap connecting means 26 includes one or more thread segments **26*a*. This embodiment with cap connecting means 26 on the outer wall 79 is preferable in that the cap connecting means 26 is suitable for connecting to the breast pump 64 and also to collar 18. As shown in FIG. 16, breast pump 64 has lower end 86 with inner threads 77 (shown by dashed lines 77). In this embodiment, liner cap 16 has liner connecting means 28 on an inner surface 34. In this embodiment, collar 18 has bottle connecting means 54 on an inner surface 49 that are suitable for connecting to the cap connecting means 26 on liner 15. In this fashion, an adapter 17** is unnecessary.

Alternatively, cap connecting means 26 is an elastomeric connecting enabling the liner 15 to stretch outwardly and over the breast pump 64 lower end 86 to form a connection by friction-fit and/or held-on by compressive force. In this latter embodiment, the user stretches connecting means 26 outwardly to separate liner 15 from breast pump 64, and liner cap 16 has suitable liner connecting means 28 with a length of at least 5 mm (about 0.2 inches) and up to about 40 mm (about 1.6 inches) (to provide a gripping surface for cap connecting means 26) to similarly receive stretchable cap connecting means 26. Such stretchable connecting means 26 can be at least partially rolled downward such that it is inverted in order to mate with neck 38 of bottle holder 14. Collar 18 is a press-fit, friction-fit, and/or interference fit connecting means 54 such that it fits over neck 38 on bottle holder and over the inverted portion of cap connecting means 26 on the liner 15. In this embodiment, an adapter 17 is unnecessary.

In yet a further embodiment, liner 15 has sufficient rigidity or thickness to obviate the need for bottle holder 14. In such embodiments, liner 15 has a thickness of between about 1 mm (0.02 inches) and about 10 mm (about 0.2 inches), or between about 1 mm (0.02 inches) and about 5 mm (about 0.1 inches). Liner 15 optionally has a tapered thickness such that liner upper end 59 has a thickness 88 that is greater than a thickness 89 in lower portion 98 of liner 15. Having a greater thickness at liner 15 upper end 59 is preferred for stability in cap connecting means 26 and avoids the need for having a separate, substantially rigid, insert as with existing COMO TOMO branded bottles.

Pump assembly 12 of the present disclosure includes fewer parts than known pump assemblies, and has the added benefit of a flexible liner 15 that is reusable, a flexible liner 15 that provides storage for breast milk, a liner 15 that is adaptable to be used with existing breast pumps 64, adapters 17 and/or bottle components such as holder 14, collar 18, nipple 19, and optionally is a standalone bottle itself (i.e. does not need a bottle holder 14). The pump assembly has five or fewer components. In one embodiment, pump assembly 12 has a breast pump 64 and a liner 15. In one embodiment, pump assembly 12 has a breast pump 64, an adapter 17, and a liner 15. In one embodiment, pump assembly 12 has a breast pump 64, an adapter 17, liner 15, and a bottle holder 14.

Holder 14 has an open top end 39 and an open bottom end 40. Holder 14 has a body 65 between the open top end 39 and the open bottom end 40. Holder 14 has an outer surface 90 opposite inner surface 91. Body 65 is generally circular about a given cross-sectional slice. The holder 14 body 65 is substantially enclosed such that a user can grasp the body 65 about any portion. The holder 14 receives liner 15 through the open top end 39. Holder has a ledge 42 suitable for mating engagement with liner 15 lip 23. Neck 38 is adjacent the open top end 39. Neck 38 includes ledge 42. Neck 38 has collar connecting means 41 for engaging collar 18. Collar connecting means 41 are on outer surface 90. Collar connecting means 41 optionally includes one or more thread segments or ribs. One or more thread segments (e.g., 41 are helical—and the thread segments make a full revolution about the liner inner wall 63.

Bottle holder 14 has an angle 93 that promotes a semi-upright feeding position lending itself to reduced colic symptoms such as gassiness, spit-up, and/or reflux. Angle 93 is between about 15 degrees and about 45 degrees. Angle 93 also improves grippability by reducing the opportunity for a user's hand to "ride-up" or slip-down the bottle holder 14.

Optionally, bottle holder 14 has an articulating joint 36 enabling the bottle holder 14 to rotate about pivot point 37 defining a pivot axis **37*a*, between a completely vertical position where the bottle holder 14 and liner 15 are aligned with the central vertical axis 11, and an angled position where the upper portion 94 of bottle holder 14 and upper portion 95 of liner 15 are skew from the central vertical axis 11. In the angled position, upper portions 94 and 95 are angled with respect to bottom portion 97 of bottle holder 14 and lower portion 98 of liner 15, respectively. Angled position provides angle 93. Pivot axis 37*a* is parallel to the plane on which the bottle holder 14** rests.

Bottle holders 14 having angle 93 and thus permitting an angled position require a liner 15 that is sufficiently flexible but capable of holding its shape such that it does not close-off at the bend 96 where angle 93 occurs. In other words, the liner 15 must be able to retain enough of its shape and not flatten-out thereby reducing the ability for fluid to travel to the nipple 19 and be suctioned-out by an infant. Accordingly, silicone with a durometer of between about 40 and about 70, with the thicknesses described by the present disclosure are advantageous.

Bottle holder 14 has a tapered region 43 that assists with grippability as it mitigates against a user's hand from "riding-up" the bottle holder 14 towards the nipple 19, and/or slipping downward towards the open bottom 40. Tapered region 43 provides bottle holder 14 with an arcuate shape, or an hourglass shape. Tapered region 43 is in middle region 75 portion of bottle holder 14. Tapered region has a maximum width (or diameter) 107 of less than about 65 mm (about 2.5 inches), or less than about 50 mm (about 2 inches). Tapered region 43 has a maximum width (or diameter) 107 that is greater than or equal to about 25 mm (about 1 inch), or greater than or equal to about 32 mm (about 1.25 inches). Tapered region 43 has a maximum width (or diameter) 107 that is between about 25 mm (about 1 inch) and about 65 mm (about 2.5 inches), or between about 32 mm (about 1.25 inches) and about 50 mm (about 2 inches).

Bottle holder has a maximum diameter 108 in either or both of the upper portion 94 and bottom portion 97 other than in the tapered region 43 of greater than about 50 mm (about 2 inches), or greater than about 65 mm (about 2.5 inches). Maximum diameter 108 is less than about 90 mm (3.5 inches), or less than about 75 mm (about 3 inches). Maximum diameter 108 is between about 50 mm (about 2 inches) and about 90 mm (about 3.5 inches), or between about 65 mm (about 2.5 inches) and about 75 mm (about 3 inches).

Bottle holder 14 has one or more grip structures 44. The one or more grips structures 44 is at least two grip structures 44*a* and 44*b*. Grip structures 44 has a grip structure height 45 of between about 0.5 mm (about 0.02 inches) to about 3 mm (about 0.12 inches). The at least one gripping structure 44 has a length of between about 25 mm (about 1 inch) and about 200 mm (about 7.9 inches). The bottle holder 14 has a total body height 92 of between about 80 mm and about 130 mm, depending on the size (or volume). For bottle holders 14 having a total body height 92 exceeding 60 mm, the at least on gripping structure 44 has a length 46 preferably between about 55 mm (about 2.1 inches) and about 140 mm (about 5.5 inches). The at least one gripping structure 44 is arcuate. The at least two gripping structures 44-44*b* that overlap to form an intersection 44*c*. The at least two gripping structures 44-44*b* optionally form two intersections 44*c*. The at least two gripping structures 44*a*-44*b* make an x-shaped, wing- or shaped pattern. The space of the bottle body 65 between the at least two gripping structures forms an arcuate shape, an oval, and/or prismatic or triangular shaped features. Collar 18 retains nipple 19 to bottle holder 14. Optionally, collar 18 retains nipple 19 to liner 15, where liner 15 is a substantially rigid material. Collar 18 has an outer surface 48 opposite said inner surface 49. In some embodiments, collar 18 has a generally circular cross-sectional shape. Optionally, collar 18 tapers. Collar 18 has a variable geometry such that the perimeter increases from the bottom end 84 to the top end 83. Such tapered geometry extends the taper in bottle holder 14. The taper can be linear, stepped, or arcuate, but preferably has a smooth surface. The taper is opposite to known collars and is shaped to promote the user's grip below the nipple 19 and mitigating against the user's grip riding-up the bottle.

Collar 18 has improved grippability. Collar 18 has a height 51 between about 20 mm (about 0.78 inches) and about 30 mm (about 1.2 inches). This height 51 is an increase up to about 33% over conventional collars. Collar 18 has at least one gripping structure 50 has a grip structure height 85 of between about 0.5 mm (about 0.02 inches) to about 3 mm (about 0.12 inches). The at least one gripping structure 50 is arcuate. The at least one gripping structure 50 is at least two gripping structures 50*a*-50*b* that overlap to form an intersection 50*c*. The at least two gripping structures 50*a*-50*b* form two intersections 50*c*. The at least two gripping structures 50*a*-50*c* make an x-shaped, wing- or shaped pattern. The at least one gripping structure 50 optionally has a pattern correlating and/or matching the at least one gripping structure 44.

Collar 18 has a lip 55 depending downwardly from the inner surface 49 in the top end 83. Lip 55 engages nipple 19 recess 58 to create a secure connection between the collar 18 and nipple 19. Lip 55 and recess 58 form a press-fit, snap-fit, interference-fit, or friction-fit.

Figure 30:
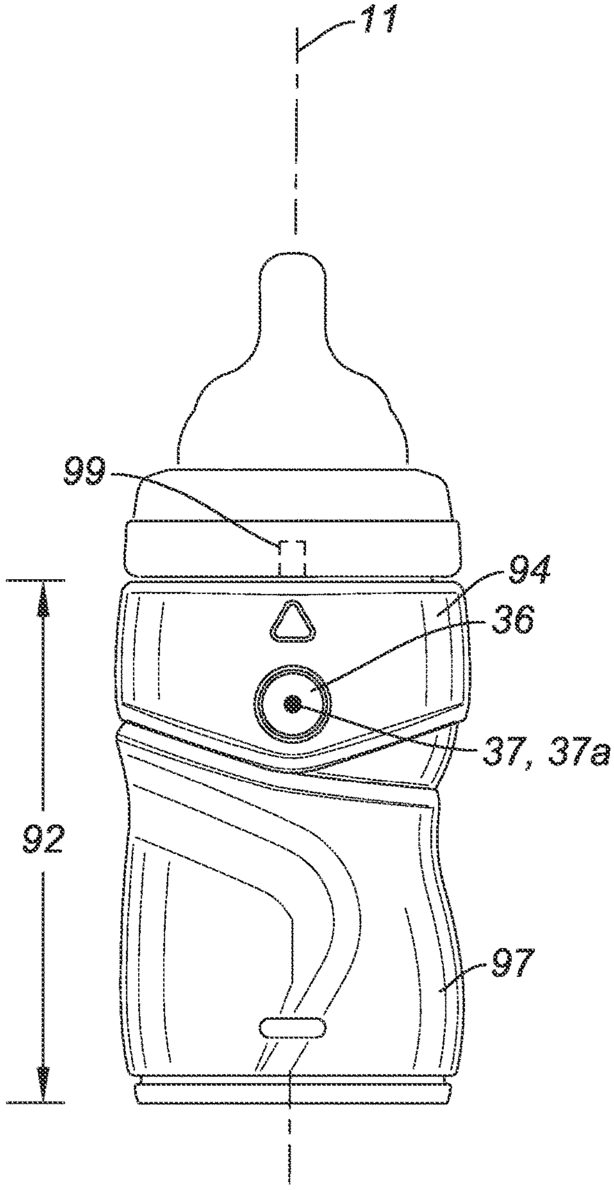
FIGS. 30-30A are diagrammatic views of a bottle assembly according to the present disclosure.
Figure 30A:
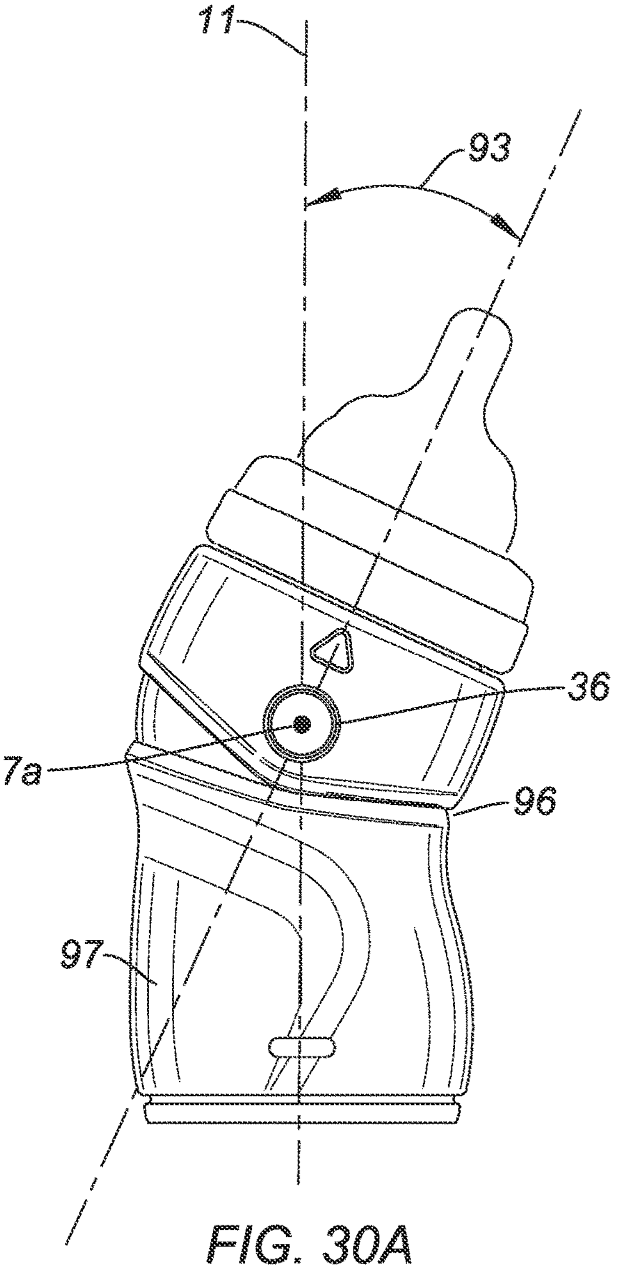
Figure 31:
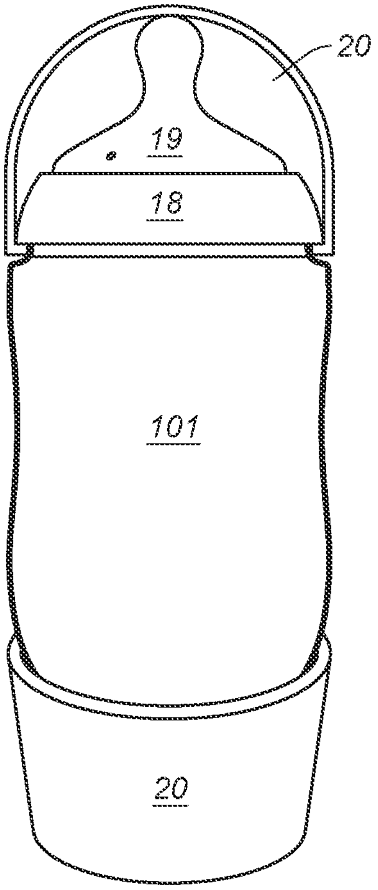
FIG. 31 is a front angled view of a bottle assembly according to one embodiment of the present disclosure.
Figure 32:
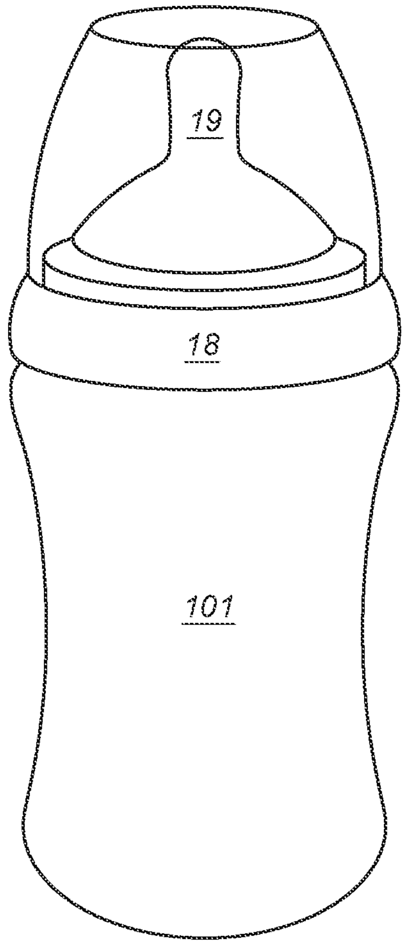
FIG. 32 is a front angled view of a bottle assembly according to one embodiment of the present disclosure.

Collar 18 has a detent 99 (shown by dashed feature 99 on FIG. 30) that is suitable for matingly engaging rib 47 on bottle holder 14 neck 38. A rib 47 is provided on the upper portion 94 of bottle holder 14 in the neck 38. Rib 47 is disposed outwardly on neck 38. Neck 38 has a shoulder 100. Rib 47 is disposed upwardly on the shoulder 100.

A detent 99 is provided on the inner surface 49 of collar 18. Detent 99 is provided on bottom end 84 of collar 18. Upon rotational movement of collar 18 with respect to bottle holder 14, detent 99 passes over rib 47 creating a tactile or audial connection confirming to the user that a sealed configuration between collar 18 and bottle holder 14 is achieved.

A nipple 19 engages has a flange 57 including a recess 58 for engaging collar lip 55. In some embodiments, nipple 19 has a vent 80 that mitigates against negative pressure build-up inside the bottle when a suction force is applied to nipple 19 orifice 81 to withdraw fluid from the liner 15. Nipples 19 having vents 80 are useful in embodiments where liner 15 is substantially sturdy and can be used without a bottle holder 14. Vent 80 is located on the flange 57 and is covered from view and/or partially obstructed by collar 18. Alternatively, vent 80 is located on bulbous region 82.

A hood 20 provides protection to nipple 19. Hood has a lower end 56 that engages collar 18. Lower end 56 optionally has one or more detents or ribs. Hood and collar matingly engage by a snap-fit, friction-fit, or interference fit between the lower end 56 (and optionally detent(s) or rib(s)) and a seat of collar 18.

The bottle assembly 10 of the present disclosure includes the same number of or fewer parts than known pump assemblies, with the added benefit of a flexible liner 15 that is reusable, a flexible liner 15 that provides storage for breast milk, a liner 15 that is adaptable to be used with existing breast pumps 64, adapters 17 and/or bottle components such as holder 14, collar 18, nipple 19, and optionally is a standalone bottle itself (i.e. does not need a bottle holder 14). The bottle assembly 10 has five or fewer components. In one embodiment, bottle assembly 10 has a liner 15 and a nipple 19. In one embodiment, bottle assembly 10 has a liner 15, a nipple 19, and a collar 18. In one embodiment, bottle assembly 10 has a liner 15, a nipple, a collar, and a bottle holder 14. In any of the bottle assembly 10 embodiments, a hood 20 is optionally included.

One advantage of some embodiments of the liner 15 of the present disclosure is that it is compatible with one or more of existing nipples, collars, and holders. As such, liner 15 does not require additional new components, thereby reducing costs and waste.

One advantage of some embodiments of the liner 15 of the present disclosure is that it is compatible with one or more of existing adapters 17 and/or existing breast pumps. As such, liner 15 does not require additional new components, thereby reducing costs and waste.

Alternative embodiments or features of the bottle assembly 10, pump assembly 12, and/or storage assembly 13 are within the scope of the present disclosure.

A bottle 101 is provided that mitigates against air mixing with the fluid in the bottle 101. The bottle includes a bottom vent 102 and valve 103 configuration that activates to relieve negative pressure in the bottle 101 upon the suction of fluid. Alternatively, bottle 101 has a straw 104 that engages nipple 19 and/or collar 18 and provides an airway outside the fluid flowing through nipple orifice 81. Preferably, straw 104 engages a nipple vent 80 as described in the present disclosure. Straw 104 is flexible and has a buoy 105 that ensures the flexible straw floats on the fluid, thereby creating a pathway for air to escape the bottle 101 through nipple vent 80 to relieve negative pressure and reducing the amount of air mixing with the milk.

Liner 15 optionally has closing or securing means to obviate the need for liner cap 16. Where liner has a mating sealing feature 115 that is flexible and involves intermeshing parts, sealer tool 109 is provided such that it is as a channel 116 and bias able sides 117 that gather and engage the sealing features thereby connecting them to each other as sealer slides over sealing features. Sealing feature 115 optionally does not require a sealer tool 109 and can be a closeable zip-locking feature 110 where features intermesh with pressure applied by a user in a fashion similar to that of sealer tool 109.

Liner 15 optionally has an alternate means of sealing, including sealing feature 115. Above sealing feature 115 is a top perforation 111 and below sealing feature 115 is a bottom perforation 112. Top perforation 111 mitigates against debris entering liner 15 prior to use. After liner 15 has satisfied its stored configuration and is being prepared to be emptied into a bottle 101, bottom perforation can remove the sealing feature 115. The liner 15 has a closed end 27 optionally formed by a Doyen seal 113. In such embodiments, liner 15 is optionally reusable but made from a thinner material (silicone or polypropylene). Liner 15 is optionally disposable and thus a thinner recyclable material such as plastics, polypropylene number 5.

Liner 15 optionally has mating tab features 114. Tab features 114 can function as an interference-fit, or snap-fit. In embodiments having bottle holder 14, tab features 114 have a low profile such that they do not extend beyond the width of ledge 42 such that tabs do not interfere with the connection of collar 18 over liner 15 as collar 18 engages bottle holder 14.

The bottle assembly 10, the pump assembly 12, the storage assembly 13 include the components as described throughout the present disclosure. Methods of use or interacting with such components are provided as discussed with respect to the structure and function of various features of various components. As such, a method of using a breast pump is provided by combining actions, functions, and features described in the present disclosure. As such, a method of storing breast milk is provided by combining actions, functions and features described in the present disclosure. As such, a method for feeding an infant from a bottle liner is provided by combining actions, functions and features described in the present disclosure.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112."

What is claimed is:

1. A bottle liner, comprising:
- a wall defining an open end and a closed end opposite the open end, the wall including a liner inner wall defining a storage volume accessed via the open end;
- a lip at the open end, the lip extending radially outward beyond a liner outer wall; and
- an upper end including an inferior end forming a ledge extending radially inward beyond the liner inner wall, the upper end including at least one thread extending inwardly from the liner inner wall.

2. The bottle liner of claim 1, wherein the ledge is proximal the at least one thread.

3. The bottle liner of claim 1, wherein the ledge is below the lip and above the closed end.

4. The bottle liner of claim 1, wherein the ledge is proximal the lip.

5. The bottle liner of claim 1, wherein the bottle liner comprises a molded stretchable elastomer.

6. The bottle liner of claim 1, further comprising a thermochromic material.

7. The bottle liner of claim 6,
- wherein the thermochromic material has a first aesthetic corresponding to a first temperature state;
- wherein the thermochromic material has a second aesthetic corresponding to a second temperature state;
- wherein the first aesthetic is different from the second aesthetic; and
- wherein the first temperature state is different from the second temperature state.

8. The bottle liner of claim 1, wherein the bottle liner has a first portion including the lip and the ledge, and a second portion including the closed end, wherein the first portion has a wall thickness that is greater than that of a second portion.

9. A bottle liner, comprising:
- a wall defining an open end and a closed end opposite the open end, the wall including a liner inner wall defining a storage volume accessed via the open end;
- a lip at the open end, the lip extending radially outward beyond a liner outer wall; and
- a ledge extending radially inward beyond the liner inner wall;
- wherein the wall has an open end thickness at the open end;
- wherein the wall has a closed end thickness at the closed end;
- wherein at least one thread extending inwardly from the liner inner wall is configured between the open end and the closed end; and
- wherein the open end thickness is greater than the closed end thickness.

10. The bottle liner of claim 9, wherein the at least one thread is configured between the open end and the ledge.

11. The bottle liner of claim 9, wherein the bottle liner comprises a molded stretchable elastomer.

12. The bottle liner of claim 9, further comprising a thermochromic material.

13. The bottle liner of claim 12,
- wherein the thermochromic material has a first aesthetic corresponding to a first temperature state;
- wherein the thermochromic material has a second aesthetic corresponding to a second temperature state;
- wherein the first aesthetic is different from the second aesthetic; and
- wherein the first temperature state is different from the second temperature state.

14. A bottle liner, comprising:
- a wall defining an open end and a closed end opposite the open end, the wall including a liner inner wall defining a storage volume accessed via the open end, the liner inner wall including at least one thread extending inwardly between the open end and the closed end;
- a lip at the open end, the lip extending radially outward beyond a liner outer wall; and a ledge extending radially inward beyond the liner inner wall;

wherein the bottle liner comprises a molded stretchable elastomer.

15. The bottle liner of claim 14, further comprising a thermochromic material.

16. The bottle liner of claim 15, wherein the thermochromic material has a first aesthetic corresponding to a first temperature state;

wherein the thermochromic material has a second aesthetic corresponding to a second temperature state;

wherein the first aesthetic is different from the second aesthetic; and wherein the first temperature state is different from the second temperature state.

17. The bottle liner of claim 14, wherein the wall has an open end thickness at the open end;

wherein the wall has a closed end thickness at the closed end;

wherein the open end thickness is greater than the closed end thickness.

18. The bottle liner of claim 14, wherein the at least one thread extends radially inward beyond the liner inner wall.

* * * * *